April 7, 1936.  A. T. STUART  2,036,613
METHOD AND APPARATUS FOR THE STORAGE OF ENERGY
Filed March 7, 1933
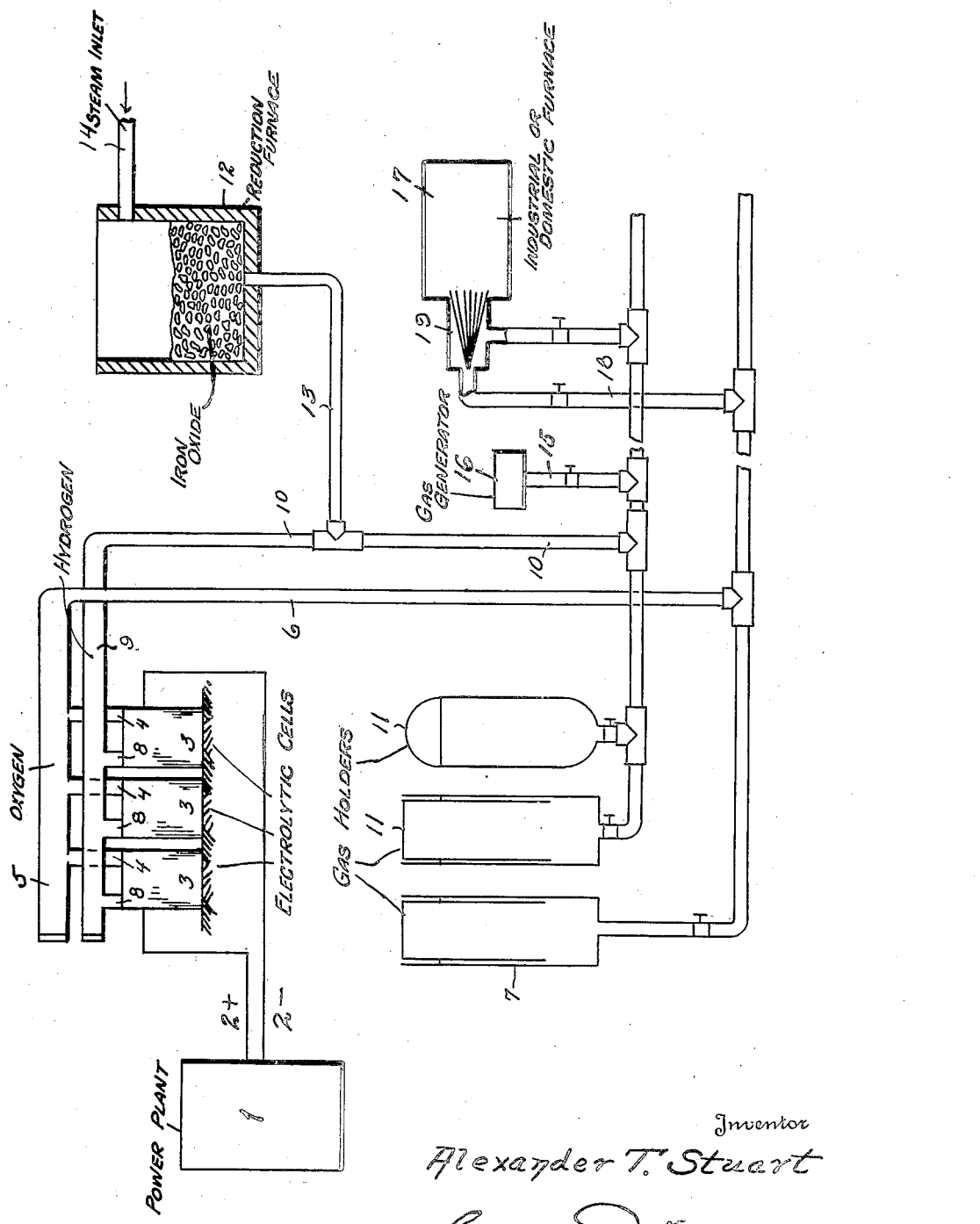
Inventor
Alexander T. Stuart
By George Piches
Attorney Patented Apr. 7, 1936

2,036,613

UNITED STATES PATENT OFFICE 2,036,613

METHOD AND APPARATUS FOR THE STORAGE OF ENERGY

Alexander Thomas Stuart, Toronto, Ontario, Canada

Application March 7, 1933, Serial No. 659,965

12 Claims. (Cl. 290—1)

My invention relates to the transformation, storage, distribution and utilization of energy in a novel manner, whereby greater efficiency is obtained than has been possible heretofore.

Power plants and systems for distributing energy to consumers operate on low load factors for reasons of the very great variations in demand for electricity. It is known to those connected with the central electric station industry that the unutilized off-peak capacity of such power plants is generally 50% to 75% of the total capacity. In addition to off-peak capacity there is usually idle surplus capacity of new power generating units erected to meet expected increases in demand for electricity.

It is an object of my invention to utilize this off-peak and surplus energy of power systems by creating more efficient methods for storing and utilizing energy. By such means I am able not only to utilize idle capacity but also to use continuous power from new power plants in an efficient and economical manner.

To clearly explain the novelty of my invention and also its great economic advantage, I will give a specific example to show the wasteful methods now in use in many parts of the world. For my example I will refer to the district in which the cities of Port Arthur and Fort William, Ontario, Canada, are located. In this region there is a large installed capacity in hydroelectric power plants and still larger resources in undeveloped water power. A large part of the installed capacity represents off-peak and surplus power which cannot be used or sold. The district has extremes of climate and is remote from sources of coal, oil and natural gas. Yet, under existing conditions, large resources in energy in the form of developed and undeveloped power remain unutilized while energy in the form of coal and oil is transported thereto at great expense. This example is not exceptional but is common to many regions in all parts of the world. The reason that such conditions exist is that no one has heretofore shown how they could be improved in an efficient, economic, and practical manner.

According to my invention I transform electric energy into another form of energy, so that it can be utilized at once or stored over long periods and subsequently distributed and utilized in a most efficient manner. According to my invention I use electric energy and transform it to the potential energy of matter which can be stored and transported and will liberate energy in the form of heat. I can do this without interfering with the normal supply of electricity by using off-peak and surplus power. According to my invention I can absorb electric energy at one time and use it to produce heat energy at the same time or days, weeks, months or years later. For instance, I can absorb electric energy in summer and use it to generate heat energy in any subsequent winter season in a most efficient manner.

It is known that electricity can be utilized to decompose water into hydrogen and oxygen and it has been proposed to store hydrogen as a gas so that it can be utilized at a later time for the production of heat. For that purpose it has been proposed to operate cells under high pressures so that hydrogen can be stored as a gas at lower cost than possible at atmospheric pressures. This method of energy storage is valuable in that energy available during a daily off-peak period, as at night, could be stored and utilized the following day. For long periods of storage, however, the method is impracticable for the reason that the cost of high pressure containers is too great to enable one to store hydrogen gas from summer to winter. Such seasonal storage therefore must be effected in low cost apparatus operated at normal pressures. Whereas it has been proposed to generate hydrogen for storage at pressures of even up to 15,000 lbs. per square inch, I can effect similar results at approximately atmospheric pressure.

In order to do this I not only transform the energy of electricity into the energy of hydrogen but I introduce one or more further transformations of energy. For the reason that it is expensive to store gas I transfer the potential energy of hydrogen to that of a solid which can be stored at atmospheric pressure and which can be subsequently used to generate hydrogen from steam. In other words I introduce several transfers of energy as (1) from electricity to hydrogen; (2) from hydrogen to a solid which I store; and (3) from the solid to hydrogen.

According to my invention, electricity produced by a hydraulic or thermic power plant is used in electrolyzers for the generation of hydrogen. As an illustration, although other known electrolytic processes could be used, I will refer to apparatus for the electrolysis of water into hydrogen and oxygen at or considerably above atmospheric pressure. The hydrogen will contain a large portion (perhaps 80%) of the energy consumed and oxygen will be a bi-product. Some of the hydrogen, for which there is an immediate or almost immediate use, is fed into a public utility pipe line system, having suitable gasometers or pressure holders to balance variations in daily demands, to various consumers. The hydrogen may be distributed alone or other gases, either combustible or non-combustible, may be mixed with it prior to distribution. The oxygen also may be distributed in separate public utility pipe lines to consumers for purposes which will be explained later on in this specification.

That amount of surplus hydrogen, for which there is no demand for heat producing purposes at the same time or the same day it is produced is prepared for storage for a matter of days, weeks, months or even years. As it is not economic to store vast quantities of gaseous hydrogen, I use, electrolytic hydrogen to produce a solid substance, which can be readily stored and transported and by means of which it is easily possible to generate hydrogen at a later time.

In carrying out my method, a suitable apparatus contains oxides of certain metals, such as iron, which when heated can be reduced by hydrogen to metal which can be used later to generate hydrogen by the action of steam on the hot metal. In various industries a somewhat similar process is used for the manufacture of hydrogen. For instance, a soap works requiring hydrogen will use water gas to reduce solid oxides of iron which, while still hot, are blasted with steam for the production of hydrogen. Ordinarily one complete cycle takes about thirty minutes and in twenty-four hours some forty-eight cycles are operated. It is apparent of course that this common practice does not utilize electricity or provide means for energy storage. According to my invention I utilize electricity which is surplus at any time to make hydrogen which I then use to reduce oxides of metal, so that the kinetic energy of electricity can be stored as the potential energy of a metallic solid. Such storage can be cheaply effected for the reason that no pressure is required and, theoretically, approximately as much hydrogen can be generated from one cubic foot of storage space as would require 15000 lbs. pressure of hydrogen gas stored. I of course effect this new and useful improvement by introducing a series of energy transfers, one being in the form of reduced metal.

In common practice the oxides and the metal remain in the solid state but the process could be operated also with the materials in a molten state, the gas or steam being blasted through the molten material. The reduced metal can be stored in the same apparatus as a solid or as a liquid. When hydrogen is required at a later time, steam is passed over or through the stored metal after it is heated. The metal reoxidizes and hydrogen is liberated from the steam and can be distributed in pipe lines to consumers for purposes of producing heat by combustion. The reoxidized metal can be used repeatedly, particularly if the reactions are performed in the molten state.

While it is not essential, the hydrogen could be enriched with fuel gases produced from other sources. This mixing with gases from other sources may not be desirable in cases where there is a large supply of power available, because it would probably introduce poisonous carbon monoxide into the gaseous mixture and other undesirable gases or impurities. Hydrogen itself, or a mixture with nitrogen, is a very desirable gas for domestic and industrial use. Hydrogen is non-poisonous; hydrogen can be burned without flues in the open room because its combustion produces only water and because the moisture humidifies the atmosphere and reduces the fuel requirements. Hydrogen is less explosive than other gases, because it is light and diffuses rapidly and will not pocket to form explosive mixtures with air so rapidly as other gases. Hydrogen burns with a hot short flame and concentrates its heat and is therefore more efficient than other gases. Hydrogen is particularly desirable as a fuel in all kinds of industrial and metallurgical and ceramic furnaces used for the manufacture of iron, steel and other metals, glass, cement, refractories, abrasives, brick, tile etc. because of the flame characteristics above named and because no impurities are added to the products made in these furnaces, and because any desired oxidizing, reducing or neutral furnace atmosphere can be obtained by merely regulating the supplies of gas and air.

I propose also to distribute the by-product electrolytic oxygen produced by the power plant in pipe lines to industrial consumers. By this procedure, pure oxygen can be added to the air or completely substitute the air used to burn fuels. Additions of pure oxygen to air tend to shorten flames, to concentrate heat and to elevate flame temperatures. This elevation in temperature can be easily controlled by regulation of the oxygen supply. This facility for elevating and controlling temperatures in industrial furnaces is an exceedingly important matter. In high temperature processes, such as glass or steel manufacture, the fuel efficiency is usually very low for the reason that the difference in temperature between the flame and the charge may be small and consequently, the flow of heat is retarded and much fuel is wasted. By elevating flame temperatures, by the admixture of pure oxygen with the air, the consumption of fuel in such industrial furnaces may be considerably reduced. I therefore propose to pipe electrolytic oxygen as well as electrolytic hydrogen, as part of a power plant system, to various industries so that they can produce high temperature heat in industrial furnaces.

I also wish to draw attention to the use of high oxygen concentrations for combustion of electrolytic hydrogen. The hydrogen oxygen flame is similar to the electric arc because the flame is short, the temperature is high, and the heat is concentrated. It has the advantage over the electric arc that the products of combustion serve to distribute and transport heat to the charge. The generation of hydrogen and oxygen with off-peak power as part of a power plant system and the distribution of the two gases separately to industry to produce high temperature flames, therefore, substitutes for the distribution of expensive peak power to industry for the operation of electric furnaces of all kinds and at the same time, provides such advantages as above named.

Referring to the drawing forming part of this specification 1 is a hydro or thermic power plant or power system having off-peak or surplus electric energy, which can be generated as or converted to direct current electricity, (2 and 2—) represent the positive and negative current leads to a battery of cells 3 connected in series for the production of hydrogen and oxygen at approximately atmospheric pressure. Each of the cells is provided with an oxygen outlet 4 and a hydrogen outlet 8. The oxygen outlets 4 are connected to a manifold 5 which serves as a conduit for conducting the oxygen to a public utility pipe line distributing system 6 which includes a gas holder indicated at 7 for storing surplus oxygen.

The hydrogen outlets 8 from the cells 3 are connected to a manifold 9 which leads to a pipe 10 forming part of a public utility distributing system, there being gas containers 11 for holding a moderate supply or limited quantity of the gas. The hydrogen for which there is no immediate demand is specially chemically treated or availed of so that the potential energy of the hydrogen is stored in such manner that hydrogen can at a later time be generated when needed without the use of high pressure tanks.

To this end I provide a reduction furnace 12 containing, originally, iron oxide and heated by any preferred or accepted means, not shown, the idea being that when hydrogen is brought into contact with the heated iron oxide it will reduce the same, so that the resultant "sponge" iron can be stored in appropriate and convenient bins above or under ground. The reducing furnace is connected with the pipe line 10 by a pipe 13 so that the surplus hydrogen will be conducted into the furnace to unite with the oxygen of the iron oxide and thereby reduce it. Leading into the reducing furnace 12 is also a pipe 14 for the purpose of later conducting steam thereinto so that the steam will be broken down into oxygen and hydrogen, the former uniting with the sponge iron to reconvert it into iron oxide, and the latter passing back into the distribution system 10.

When the demand for hydrogen exceeds the supply furnished by the electrolytic cells 3 and the storage tanks 11 the supply is augmented by breaking down steam in the reducing furnace and feeding the resultant hydrogen into the system 10.

If it is desired to enrich the gas a pipe 15 leads gas from a plant 16 used to produce such enriching gas. In an example, 23 may represent apparatus to gasify liquid butane, or it may represent a gas oil plant, a coal gas plant, coke oven plant, a supply of natural gas, or any source of any gas which it may be desired to add to the system 10.

17 represents an industrial furnace of any kind in which electrolytic hydrogen alone, or mixed with other gases, is burned to produce heat. The pipe 18 leads electrolytic oxygen from the pipe line system 6 to the burner 19 where both electrolytic hydrogen and electrolytic oxygen are burned together to produce heat. It is understood of course that oxygen can be also distributed for all other purposes.

In the drawing forming part of this specification I have illustrated only one means for using surplus hydrogen, that of reducing solid oxides or iron, but it is to be understood that other means, such as reducing molten metals from oxides, could also be used for similar purposes.

From the above specification and drawing forming part thereof it is seen that my invention utilizes off-peak and surplus electric energy and transforms it first into the potential energy of hydrogen gas and subsequently into the potential energy of other substances which can be stored and transported and which will liberate energy in the form of heat at a different time and place. The methods I have described are merely to illustrate my invention. I wish to point out that there are several other known chemical processes for accomplishing similar results and that it is to be understood that I do not limit myself to the methods described, because obvious modification will occur to a person skilled in the art.

Having thus fully described my invention what I claim as new and desire to secure by Letters Patent is:

1. In an electric power system, electrolytic apparatus for the production of hydrogen, means for storing energy at atmospheric pressure consisting of apparatus for the manufacture of a metallic substance with the hydrogen, storage means for the said substance and apparatus for producing hydrogen with said substance.

2. In an electric power system, electrolytic apparatus for the production of hydrogen, means for storing energy at atmospheric pressure consisting of apparatus for the manufacture of a metallic substance with the hydrogen, storage means for the said substance, apparatus for producing hydrogen with said substance and distribution means, the said distribution means constituted by public utility pipe lines.

3. In an electric power system, electrolytic apparatus for the production of hydrogen, means for storing energy at atmospheric pressure consisting of apparatus for the manufacture of a metallic substance with the hydrogen, storage means for the said substance, apparatus for producing hydrogen with said substance, distribution means, the said distribution means constituted by public utility pipe lines and heat producing means, said heat producing means constituted by hydrogen burners.

4. In an electric power system, electrolytic apparatus for the production of hydrogen, hydrogen distribution means constituted by public utility pipe lines, means for storing energy at atmospheric pressure of the surplus hydrogen consisting of apparatus for the manufacture of a metallic substance with said surplus hydrogen, storage means for the said substance, apparatus for producing hydrogen with said substance and means for adding hydrogen so produced to the hydrogen distribution means.

5. In an electric power system, electrolytic apparatus for the generation of hydrogen and oxygen, separate hydrogen and oxygen distribution means constituted by public utility pipe lines, heat producing means constituted by hydrogen burners, means for storing the energy at atmospheric pressure of the surplus hydrogen consisting of apparatus for the manufacture of a metallic substance with the said surplus hydrogen, storage means for said substance, apparatus for producing hydrogen with said substance and means for adding hydrogen so produced to the hydrogen distribution means.

6. In an electric power system, electrolytic apparatus for the production of hydrogen and oxygen, separate hydrogen and oxygen distribution means constituted by public utility pipe lines, heat producing means constituted by burners consuming electrolytic hydrogen and electrolytic oxygen, means for storing the energy at atmospheric pressure of the surplus hydrogen consisting of apparatus for the manufacture of a metallic substance with the hydrogen, storage means for the said substance, apparatus for producing hydrogen with said substance and means for adding the hydrogen so produced to the hydrogen distribution means.

7. In an electric power system, electrolytic apparatus for the production of hydrogen, hydrogen distribution means constituted by public utility pipe lines, heat producing means constituted by hydrogen burners, means for storing the energy of the surplus hydrogen consisting of apparatus for the reduction of metallic oxides to metal with the surplus hydrogen, storage means for the said metal, apparatus for producing hydrogen from steam with the said metal and means for adding the hydrogen so produced to the hydrogen distribution means.

8. In an electric power system, the method of storing energy at atmospheric pressure produced by the system, comprising the generation of electrolytic hydrogen, the production of a metallic substance, the storage of the substance and subsequent utilization of said substance to generate hydrogen, whereby electric energy is transformed to the potential energy of hydrogen gas, thence to the metallic substance and subsequently again to hydrogen gas.

9. Means for storing energy at atmospheric pressure consisting of apparatus for the manufacture of hydrogen, apparatus for the manufacture of a metallic substance by union with the hydrogen, storage means for the said substance, apparatus for producing hydrogen with said substance and means for generating heat by its combustion.

10. In an electric power system, the method of storing energy produced by the system, comprising the transfer of the kinetic energy of electricity to the potential energy of hydrogen, then to the potential energy of a metallic substance, the storage of the said metallic substance and the subsequent transfer of its potential energy to that of hydrogen gas.

11. In an electric power system, the method of storing surplus electrical energy comprising utilizing it for electrolytically generating hydrogen, utilizing the hydrogen to reduce a metallic oxide, storing the metal obtained by such reduction until energy is demanded, reoxidizing the metal with steam to release the hydrogen content of the steam, and then utilizing the thus liberated hydrogen.

12. The method of utilizing hydrogen which is surplus at one time for the production of hydrogen at a later time, comprising utilizing the hydrogen to reduce a metallic oxide, storing the metal obtained by such reduction, reoxidizing the metal with steam to release the hydrogen content of the steam and then utilizing the thus liberated hydrogen.

ALEXANDER THOMAS STUART.